US010986659B2

(12) United States Patent
Lin

(10) Patent No.: US 10,986,659 B2
(45) Date of Patent: Apr. 20, 2021

(54) WIRELESS COMMUNICATION METHOD, TERMINAL AND NETWORK DEVICE

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 200 days.

(21) Appl. No.: 16/336,449

(22) PCT Filed: Feb. 8, 2018

(86) PCT No.: PCT/CN2018/075878
§ 371 (c)(1),
(2) Date: Mar. 25, 2019

(87) PCT Pub. No.: WO2019/153212
PCT Pub. Date: Aug. 15, 2019

(65) Prior Publication Data
US 2021/0068136 A1  Mar. 4, 2021

(51) Int. Cl.
*H04W 72/12* (2009.01)
*H04L 5/00* (2006.01)
(52) U.S. Cl.
CPC ....... *H04W 72/1284* (2013.01); *H04L 5/0053* (2013.01)
(58) Field of Classification Search
CPC ..................... H04W 88/085; H04L 5/0053
See application file for complete search history.

(56) References Cited

U.S. PATENT DOCUMENTS

| 2017/0041923 | A1 | 2/2017 | Park |
| 2017/0339716 | A1 | 11/2017 | Moosavi et al. |
| 2020/0267753 | A1* | 8/2020 | Adjakple ............. H04W 72/14 |

FOREIGN PATENT DOCUMENTS

| CN | 1863302 A | 11/2006 |
| CN | 103973397 A | 8/2014 |
| CN | 104601309 A | 5/2015 |

(Continued)

OTHER PUBLICATIONS

Extended European Search Report in the European application No. 18849468.6, dated Sep. 24, 2019.

(Continued)

*Primary Examiner* — Ronald B Abelson
(74) *Attorney, Agent, or Firm* — Ladas & Parry, LLP

(57) ABSTRACT

The embodiments of the disclosure provide a method for wireless communication and a device, which may implement flexible transmission of a scheduling request situation for Scheduling Request (SR) information under multiple sets of SR configurations. The method includes that: a terminal determines K pieces of SR information, here, K is a positive integer; and the terminal sends a target channel, here, the target channel includes M-bit first information, the M-bit first information is used to indicate a scheduling request situation for at least part of the K pieces of SR information, M is a positive integer and a value of M is determined based on a relationship between K and at least one first numerical value.

20 Claims, 6 Drawing Sheets

(56) References Cited

FOREIGN PATENT DOCUMENTS

| CN | 104683064 A | 6/2015 |
|---|---|---|
| CN | 104684093 A | 6/2015 |
| CN | 106160956 A | 11/2016 |
| CN | 107222926 A | 9/2017 |
| CN | 107343316 A | 11/2017 |

OTHER PUBLICATIONS

First Office Action of the Chinese application No. 201880003860.7, dated Nov. 29, 2019.

International Search Report in the international application No. PCT/CN2018/075878, dated Oct. 29, 2018.

Samsung: "Remaining Issues for Short PUCCH with UCI of more than 2 Bits", 3GPP Draft; R1-1720327 Short PUCCH With More Than 2 Bits-Samsung, 3rd Generation Partnership Project(3GPP), Mobile Competence Centre; 650, Route Des Lucioles; F-06921 Sophia-Antipolis Cedex; Franc, vol. RAN WG1, No. Reno, USA; Nov. 27, 2017-Dec. 1, 2017 Nov. 18, 2017(Nov. 18, 2017), XP051369915.

LG Electronics: "Text proposals for short PUCCH structure", 3GPP Draft; R1-1800375, 3rd Generation Partnership Project(3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018 Jan. 13, 2018(Jan. 13, 2018), XP051384830, Retrieved from the Internet: URL:http://www.3gpp.org/ftp/tsg%5Fran/WG1%5FRL1/TSGR1%5FAH/NR%5FAN%5F1801/Docs/ <retrieved on Jan. 13, 2018> *section 4; pp. 7, 8*.

Ericsson: "On UE Behavior for UCI Reporting and Other Issues", GPP Draft; R1-1800947, 3rd Generation Partnership Project(3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018 Jan. 13, 2018(Jan. 13, 2018), XP051385180 Retrieved from the Internet: URL:http://www.3gpp.org/ftp/tsg%5Fran/WG1%5FRL1/TSGR1%5FAH/NR%5FAN%5F1801/Docs/ <retrieved on Jan. 13, 2018> *section 2, 3; pp. 1-19*.

International Search Report in international application No. PCT/CN2018/075878, dated Oct. 29, 2018.

Written Opinion of the International Search Authority in international application No. PCT/CN2018/075878, dated Oct. 29, 2018.

Written Opinion of the International Search Authority in the international application No. PCT/CN2018/075878, dated Oct. 29, 2018.

Notice of Allowance of the Chinese application No. 201880003860.7, dated Jun. 1, 2020.

* cited by examiner

WIRELESS COMMUNICATION METHOD, TERMINAL AND NETWORK DEVICE

CROSS-REFERENCE TO RELATED APPLICATION

This application is the U.S. national phase of PCT Application No. PCT/CN2018/075878 filed on Feb. 8, 2018, the disclosure of which is incorporated in its entirety by reference herein.

TECHNICAL FIELD

The disclosure relates to the field of communications, and more particularly to a method for wireless communication, a terminal and a network device.

BACKGROUND

In a 5th-Generation (5G) system, multiple sets of Scheduling Request (SR) configurations may be configured for a user, and each set of SR configuration corresponds to an independent cycle, offset and Physical Uplink Control Channel (PUCCH) resource. Different SR configurations correspond to different service channel parameters.

At present, there is yet no solution for how a terminal performs scheduling request for multiple sets of SR configurations.

SUMMARY

Embodiments of the disclosure provide a method for wireless communication and a device, which may implement flexible transmission of a scheduling request situation for SR information under multiple sets of SR configurations.

In a first aspect, there is provided a method for wireless communication, which may include the following operations.

A terminal determines K pieces of SR information, here, K is a positive integer.

The terminal sends a target channel, here, the target channel includes M-bit first information, the M-bit first information is used to indicate a scheduling request situation for at least part of the K pieces of SR information, M is a positive integer and a value of M is determined based on a relationship between K and at least one first numerical value.

In combination with the first aspect, in a possible implementation mode of the first aspect, the target channel may be configured to transmit second information for non-SR information.

The target channel may overlaps, in a time domain, with a resource configured to transmit the K pieces of SR information.

In combination with the first aspect or any abovementioned possible implementation mode thereof, in another possible implementation mode of the first aspect, the second information may be Acknowledge (ACK)/Non-Acknowledge (NACK) information or Channel State Information (CSI).

In combination with the first aspect or any abovementioned possible implementation mode thereof, in another possible implementation mode of the first aspect, M may be equal to K when K is less than or equal to the at least one first numerical value.

In combination with the first aspect or any abovementioned possible implementation mode thereof, in another possible implementation mode of the first aspect, the K pieces of SR information may be in one to one correspondences with the M-bit first information by means of bit mapping.

In combination with the first aspect or any abovementioned possible implementation mode thereof, in another possible implementation mode of the first aspect, when K is greater than or equal to the at least one first numerical value, $M=\text{ceil}(\log_2(K+1))$, or M may be a second numerical value, here, the second numerical value is a constant less than K.

In combination with the first aspect or any abovementioned possible implementation mode thereof, in another possible implementation mode of the first aspect, the M-bit first information may be used to indicate that each of the K pieces of SR information represents absence of SR, or indicate that at least one piece of the K pieces of SR information represents presence of SR.

In combination with the first aspect or any abovementioned possible implementation mode thereof, in another possible implementation mode of the first aspect, the method may further include the following operation.

A value of the M-bit first information is determined according to at least one of: whether each of the K pieces of SR information represents presence of SR; or an ordering of the K pieces of SR information, and according to predefined mapping relationships.

In the predefined mapping relationships, different values of the M-bit first information may correspond to different scheduling request situations for the K pieces of SR information.

In combination with the first aspect or any abovementioned possible implementation mode thereof, in another possible implementation mode of the first aspect, the ordering of the K pieces of SR information may be associated with at least one of respective resource configuration parameters or service channel parameters for the K pieces of SR information; or the ordering of the K pieces of SR information may be configured through high-layer signaling.

In combination with the first aspect or any abovementioned possible implementation mode thereof, in another possible implementation mode of the first aspect, the at least one first numerical value may be preset on the terminal or configured by a network side.

In a second aspect, there is provided a method for wireless communication, which may include the following operations.

A network device receives a target channel sent by a terminal.

The network device acquires a scheduling request situation for at least part of K pieces of SR information of the terminal from M-bit first information in the target channel, here, M is a positive integer and a value of M is determined based on a relationship between K and at least one first numerical value.

In combination with the second aspect, in a possible implementation mode of the second aspect, the target channel may be configured to transmit second information for non-SR information.

The target channel may overlaps, in a time domain, with a resource configured to transmit the K pieces of SR information.

In combination with the second aspect or any abovementioned possible implementation mode thereof, in another possible implementation mode of the second aspect, the second information may be ACK/NACK information or CSI.

In combination with the second aspect or any abovementioned possible implementation mode thereof, in another possible implementation mode of the second aspect, M may be equal to K when K is less than or equal to the at least one first numerical value.

In combination with the second aspect or any abovementioned possible implementation mode thereof, in another possible implementation mode of the second aspect, the K pieces of SR information may be in one to one correspondences with the M-bit first information by means of bit mapping.

In combination with the second aspect or any abovementioned possible implementation mode thereof, in another possible implementation mode of the second aspect, when K is greater than or equal to the at least one first numerical value, $M=\text{ceil}(\log_2(K+1))$, or M may be a second numerical value, here, the second numerical value is a constant less than K.

In combination with the second aspect or any abovementioned possible implementation mode thereof, in another possible implementation mode of the second aspect, the M-bit first information may be configured to indicate that each of the K pieces of SR information represents absence of SR, or indicate that at least one piece of the K pieces of SR information represents presence of SR.

In combination with the second aspect or any abovementioned possible implementation mode thereof, in another possible implementation mode of the second aspect, the operation that the network device acquires the scheduling request situation for the at least part of the K pieces of SR information of the terminal from the M-bit first information in the target channel may include the following operation.

The network device determines the scheduling request situation for the at least part of the K pieces of SR information based on a value of the M-bit first information and preset mapping relationships.

In the predefined mapping relationships, different values of the M-bit first information may correspond to different scheduling request situations for the K pieces of SR information.

In a third aspect, there is provided a terminal, which is configured to execute the method in the first aspect or any possible implementation mode of the first aspect. Specifically, the terminal includes functional modules configured to execute the method in the first aspect or any possible implementation mode of the first aspect.

In a fourth aspect, there is provided a network device, which is configured to execute the method in the second aspect or any possible implementation mode of the second aspect. Specifically, the network device includes functional modules configured to execute the method in the second aspect or any possible implementation mode of the second aspect.

In a fifth aspect, there is provided a terminal, which includes a processor, a memory and a transceiver. The processor, the memory and the transceiver communicate with one another through an internal connecting path to transmit control and/or data signals to enable the terminal to execute the method in the first aspect or any possible implementation mode of the first aspect.

In a sixth aspect, there is provided a network device, which includes a processor, a memory and a transceiver. The processor, the memory and the transceiver communicate with one another through an internal connecting path to transmit control and/or data signals to enable the network device to execute the method in the second aspect or any possible implementation mode of the second aspect.

In a seventh aspect, there is provided a computer-readable medium, which is configured to store a computer program including an instruction configured to execute the method in each aspect or any possible implementation mode.

In an eighth aspect, there is provided a computer program product including an instruction, which runs on a computer to enable the computer to execute the method in each aspect or any possible implementation mode.

Accordingly, in the embodiments of the disclosure, the K pieces of SR information are determined, the value of M is determined based on the relationship between K and the at least one first numerical value and the M-bit first information carried in the target channel is used to indicate the scheduling request situation for the at least part of the K pieces of SR information. Therefore, flexible transmission of the scheduling request situation for the SR information may be implemented.

BRIEF DESCRIPTION OF DRAWINGS

In order to describe the technical solutions of the embodiments of the disclosure more clearly, the drawings required to be used in descriptions about the embodiments or a related art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide interoperability for Microwave Access (WiMAX) communication system or a future 5G system (which may also be called a New Radio (NR) system).

Figure 1:
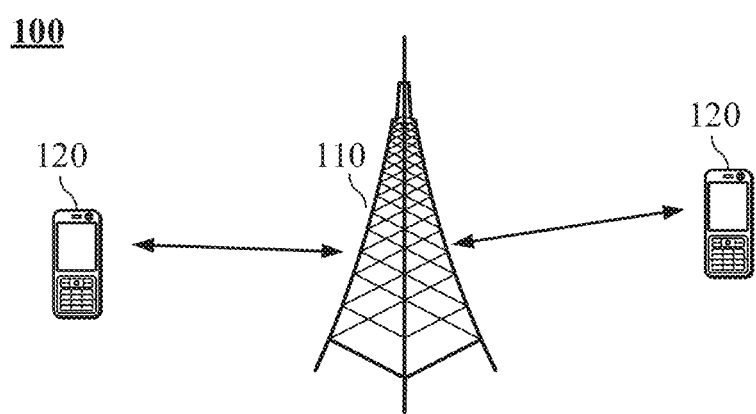
FIG. 1 is a schematic diagram of a wireless communication system according to an embodiment of the disclosure.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) located in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 located within the coverage of the network device 110. The terminal devices 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Optionally, the terminal devices 120 may perform Device to Device (D2D) communication.

Optionally, the 5G system or network may also be called an NR (New Radio) system or network.

A network device and two terminal devices are exemplarily illustrated in FIG. 1. Optionally, the wireless communication system 100 may include multiple network devices and another number of terminal devices may be included in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 2:
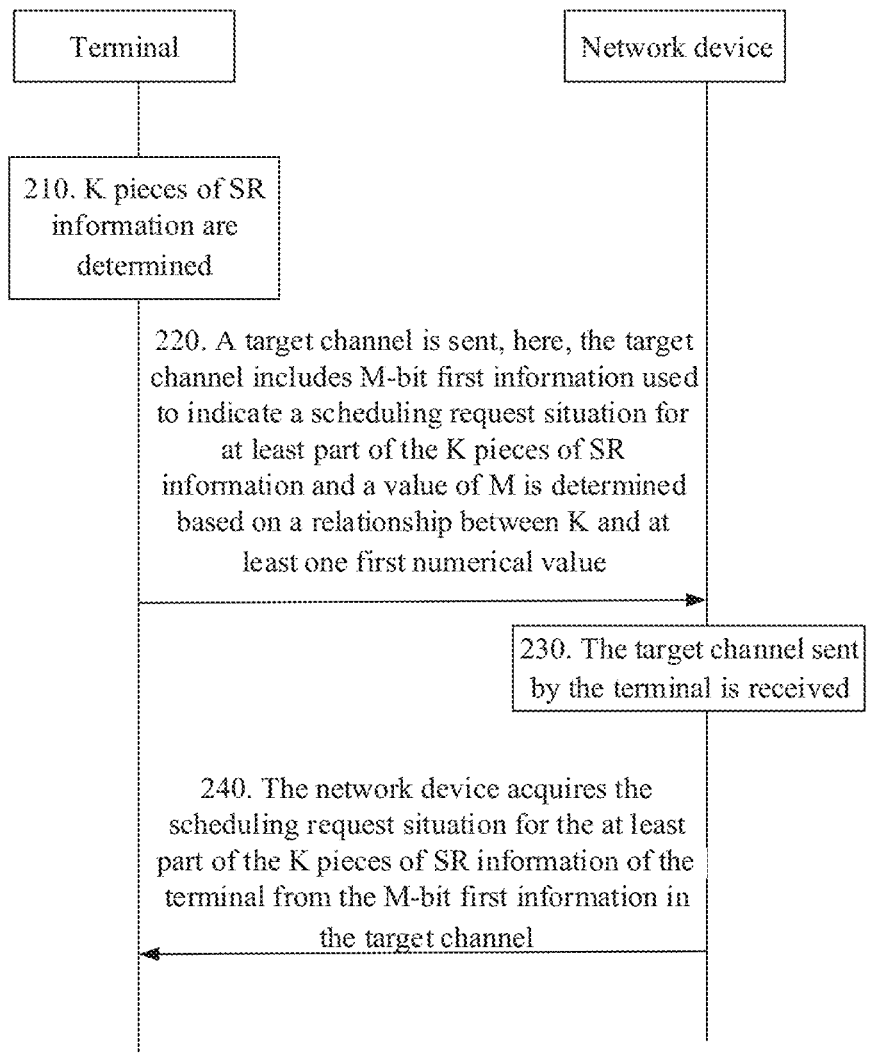
FIG. 2 is a schematic flowchart of a method for wireless communication according to an embodiment of the disclosure.

FIG. 2 is a schematic flowchart of a method 200 for wireless communication according to an embodiment of the disclosure. The method 200 may optionally be applied, but not limited, to the system illustrated in FIG. 1. As illustrated in FIG. 2, the method 200 includes at least part of the following contents.

In 210, a terminal determines K pieces of SR information, here, K is a positive integer. Specifically, K is an integer greater than 2.

Optionally, SR configurations corresponding to the K pieces of SR information may be all SR configurations configured for the terminal and may also be part of SR configurations configured for the terminal.

Optionally, a transmission resource for the K pieces of SR information overlaps, in a time domain, with a transmission resource for a target channel to be sent. Overlapping mentioned in the embodiment of the disclosure may refer to complete overlapping and may also refer to partial overlapping.

Optionally, the target channel is configured to transmit second information for non-SR information.

Optionally, the target channel mentioned in the embodiment of the disclosure may be a PUCCH. Herein, the PUCCH may be a PUCCH in a format 2, 3 or 4. In such case, the target channel may be configured to transmit an ACK/a NACK, or may be configured to carry CSI.

Optionally, the target channel mentioned in the embodiment of the disclosure may also be a Physical Uplink Shared Channel (PUSCH). In such case, the target channel may be configured to carry uplink data.

In 220, the terminal sends a target channel, herein, the target channel includes M-bit first information, the M-bit first information is used to indicate a scheduling request situation for at least part of the K pieces of SR information, M is a positive integer and a value of M is determined based on a relationship between K and at least one first numerical value.

Specifically, the terminal may determine the value of M according to the relationship between K and the at least one first numerical value and indicate the scheduling request situation for the at least part of the K pieces of SR information by use of the M-bit first information.

Optionally, the target channel may further include the second information with at least one bit.

Optionally, the at least one first numerical value is preset on the terminal or configured by a network side.

Optionally, the terminal may determine the value of M according to the relationship between K and one first numerical value. In such case, the first numerical value defines two ranges, for example, a first range greater than or equal to the first numerical value or a second range less than the first numerical value, and the terminal may determine the range to which K belongs in the first range and the second range, thereby determining the value of M.

Optionally, the terminal may also determine the value of K according to the relationship between K and multiple first numerical values. In such case, the multiple first numerical values may define more than two ranges, and the terminal may determine the range within which K falls and determine the value of M based on the determined range.

Herein, different rules may be adopted to determine the value of M when K falls within different ranges.

For example, under the condition that K falls within a first range, the value of M may be equal to K. Under the condition that K falls within a second range, K may be determined according to a certain calculation formula.

Optionally, when different rules are adopted to determine the value of K, the M-bit first information may also indicate the scheduling request situation in different manners.

Optionally, M is equal to K when K is less than or equal to the at least one first numerical value.

In such case, the K pieces of SR information are in one to one correspondences with the M-bit first information by means of bit mapping.

For example, there is made such a hypothesis that the first numerical value is 4, K=2 and the K pieces of SR information are SR0 and SR1 respectively. Since K is less than 4, the value of M may be 2, that is, SR0 and SR1 are indicated by two bits. For example, a bit value "0" indicates that the corresponding SR is negative (namely, there is no SR or scheduling is not requested) and a bit value "1" indicates that the corresponding SR is positive (namely, there is an SR or scheduling is requested).

Optionally, M is less than K when K is greater than or equal to the at least one first numerical value.

Optionally, when K is greater than or equal to the at least one first numerical value, $M=\operatorname{ceil}(\log_2(K+1))$, or M is a second numerical value, here, the second numerical value is a constant less than K.

In such case, the M-bit first information is used to indicate that the K pieces of SR information represents absence of SR, or indicate that at least one piece of the K pieces of SR information represents presence of SR.

Herein, when the M-bit first information adopts different values, the amounts of the SR information, for which a scheduling request situation is indicated by the M-bit first information, may be different and of course, may also be the same.

Optionally, the terminal may determine the value of the M-bit first information according to at least one of whether each of the K pieces of SR information represents presence of SR; or an ordering of the K pieces of SR information, and according to predefined mapping relationships. In the predefined mapping relationships, different values of the M-bit first information correspond to different scheduling request situations for the K pieces of SR information.

Optionally, the ordering of the K pieces of SR information is associated with at least one of respective resource configuration parameters or service channel parameters for the K pieces of SR information; or the ordering of the K pieces of SR information is configured through high-layer signaling.

Specifically, since the number of bits of M bits is limited and there are relatively more scheduling request situations for the K pieces of SR information, it is impossible to distinguish any two different conditions. Therefore, the ordering of the K pieces of SR information may be considered.

For example, for the situation that each of multiple pieces of SR information represents that a SR is required, only the SR information ranked at early positions may be reported to the network side.

Optionally, the multiple pieces of SR information may also be grouped and the scheduling request situations are reported by taking group as the unit. Herein, grouping may refer to uniform grouping and may also refer to nonuniform grouping.

For example, a group to which the SR information ranked at the early positions belongs includes a relatively small amount of SR information (for example, including only one piece of SR information), and a group to which the SR information ranked at late positions belongs includes a relatively large amount of SR information (for example, including multiple pieces of SR information).

During reporting by taking group as the unit, if at least part of SR information in a group represents that scheduling is requested, it is determined that the group represents that scheduling is requested.

For convenient understanding, descriptions will be made below in combination with two examples.

Example 1

There is made such a hypothesis that K=3, the K pieces of SR information are SR0, SR1 and SR2 respectively and $M=\operatorname{ceil}(\log_2(k+1))=2$. Herein, the ordering of the SRs is performed according to cycle lengths of the SRs, where SR0 corresponds to a shortest cycle and SR2 corresponds to a longest cycle.

As illustrated in Table 1, if each of SR0, SR1 and SR2 represents that there is no SR, the value of the M-bit first information is (0, 0). If SR0 represents that there is SR (no matter whether each of SR1 and SR2 represents presence of SR or not), the value of the M-bit first information is (0, 1). If SR0 represents that there is no SR and SR1 represents that there is SR (no matter whether SR2 represents presence of SR or not), the value of the M-bit first information is (1, 0). If each of SR0 and SR1 represents that there is no SR and SR2 represents that there is SR, the value of the M-bit first information is (1, 1).

TABLE 1

| M-bit first information (2 bit) | SR |
| --- | --- |
| 0, 0 | No SR |
| 0, 1 | SR0 is positive |
| 1, 0 | SR1 is positive |
| 1, 1 | SR2 is positive |

Example 2

There is made such a hypothesis that K=5, the K pieces of SR information are SR0, SR1, SR2, SR3 and SR4 respectively and the value of M is equal to a constant 2. Herein, the ordering is performed according to cycle lengths of the SRs, where SR0 corresponds to a shortest cycle and SR4 corresponds to a longest cycle.

As illustrated in Table 2, if each of SR0, SR1, SR2, SR3 and SR4 represents that there is no SR, the value of the M-bit first information is (0, 0). If SR0 represents that there is SR (no matter whether each of SR1, SR2, SR3 and SR4 represents presence of SR or not), the value of the M-bit first information is (0, 1). If SR0 represents that there is no SR and SR1 represents that there is SR (no matter whether each of SR2, SR3 and SR4 represents presence of SR or not), the value of the M-bit first information is (1, 1). If each of SR0 and SR1 represents that there is no SR and at least one of SR2, SR3 or SR4 represents that there is SR, the value of the M-bit first information is (1, 1).

TABLE 2

| M-bit first information (2 bit) | SR |
| --- | --- |
| 0, 0 | No SR |
| 0, 1 | SR0 is positive |
| 1, 0 | SR1 is positive |
| 1, 1 | Other |

In 230, a network device receives the target channel sent by the terminal.

In 240, the network device acquires the scheduling request situation for the at least part of the K pieces of SR information of the terminal from the M-bit first information in the target channel, here, M is a positive integer and the value of M is determined based on the relationship between K and the at least one first numerical value.

Specifically, the network device may determine the value of M based on the relationship between K and the at least one first numerical value. How to specifically determine the value of M may refer to the abovementioned manner in which the terminal determines the value of M.

Optionally, the network device determines the scheduling request situation for the at least part of the K piece of SR information based on the value of the M-bit first information and the preset mapping relationships. In the preset mapping relationships, different values of the M-bit first information correspond to different scheduling request situations for the K pieces of SR information.

Accordingly, in the embodiment of the disclosure, the K pieces of SR information are determined, the value of M is determined based on the relationship between K and the at least one first numerical value and the M-bit first information carried in the target channel is used to indicate the scheduling request situation for the at least part of the K pieces of SR information. Therefore, flexible transmission of the scheduling request situation for the SR information may be implemented.

Figure 3:
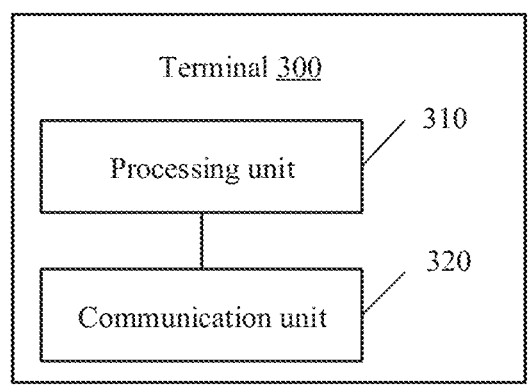
FIG. 3 is a schematic block diagram of a terminal according to an embodiment of the disclosure.

FIG. 3 is a schematic block diagram of a terminal 300 according to an embodiment of the disclosure. The terminal 300 includes a processing unit 310 and a communication unit 320. Herein, the processing unit 310 is configured to determine K pieces of SR information, here, K is a positive integer. The communication unit 320 is configured to send a target channel, here, the target channel includes M-bit first information, the M-bit first information is used to indicate a scheduling request situation for at least part of the K pieces of SR information, M is a positive integer and a value of M is determined based on a relationship between K and at least one first numerical value.

Optionally, the target channel is configured to transmit second information for non-SR information.

The target channel may overlaps, in a time domain, with a resource configured to transmit the K pieces of SR information.

Optionally, the second information is ACK/NACK information or CSI.

Optionally, M is equal to K when K is less than or equal to the at least one first numerical value.

Optionally, the K pieces of SR information are in one to one correspondences with the M-bit first information by means of bit mapping.

Optionally, when K is greater than or equal to the at least one first numerical value, M=ceil($\log_2$(K+1)), or M is a second numerical value, here, the second numerical value being a constant less than K.

Optionally, the M-bit first information is used to indicate that each of the K pieces of SR information represents absence of SR, or indicate that at least one piece of the K pieces of SR information represents presence of SR.

Optionally, the processing unit 310 is further configured to determine a value of the M-bit first information according to at least one of: whether each of the K pieces of SR information represents presence of SR; or an ordering of the K pieces of SR information, and according to predefined mapping relationships.

In the predefined mapping relationships, different values of the M-bit first information correspond to different scheduling request situations for the K pieces of SR information.

Optionally, the ordering of the K pieces of SR information is associated with at least one of respective resource configuration parameters or service channel parameters for the K pieces of SR information; or the ordering of the K pieces of SR information is configured through high-layer signaling.

Optionally, the at least one first numerical value is preset on the terminal or configured by a network side.

It is to be understood that the terminal 300 may correspond to the terminal in the method 200 and may implement corresponding operations of the terminal in the method 200. For simplicity, elaborations will be omitted herein.

Figure 4:
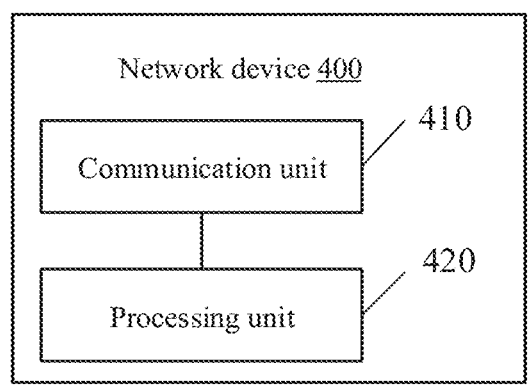
FIG. 4 is a schematic block diagram of a network device according to an embodiment of the disclosure.

FIG. 4 is a schematic block diagram of a network device 400 according to an embodiment of the disclosure. As illustrated in FIG. 4, the network device 400 includes a communication unit 410 and a processing unit 420.

The communication unit 410 is configured to receive a target channel sent by a terminal.

The processing unit 420 is configured to acquire a scheduling request situation for at least part of K pieces of SR information of the terminal from M-bit first information in the target channel, here, M is a positive integer and a value of M is determined based on a relationship between K and at least one first numerical value.

Optionally, the target channel is configured to transmit second information for non-SR information.

The target channel overlaps, in a time domain, with a resource configured to transmit the K pieces of SR information.

Optionally, the second information is ACK/NACK information or CSI.

Optionally, M is equal to K when K is less than or equal to the at least one first numerical value.

Optionally, the K pieces of SR information are in one to one correspondences with the M-bit first information by means of bit mapping.

Optionally, when K is greater than or equal to the at least one first numerical value, M=ceil($\log_2$(K+1)), or M is a second numerical value, here, the second numerical value is a constant less than K.

Optionally, the M-bit first information is used to indicate that each of the K pieces of SR information represents absence of SR, or indicate that at least one piece of the K pieces of SR information represents presence of SR.

Optionally, the processing unit 420 is further configured to determine the scheduling request situation for the at least part of the K pieces of SR information based on a value of the M-bit first information and preset mapping relationships.

In the predefined mapping relationships, different values of the M-bit first information correspond to different scheduling request situations for the K pieces of SR information.

It is to be understood that the network device 400 may correspond to the network device in the method 200, may implement corresponding operations of the network device in the method 200 and, for simplicity, will not be elaborated herein.

Figure 5:
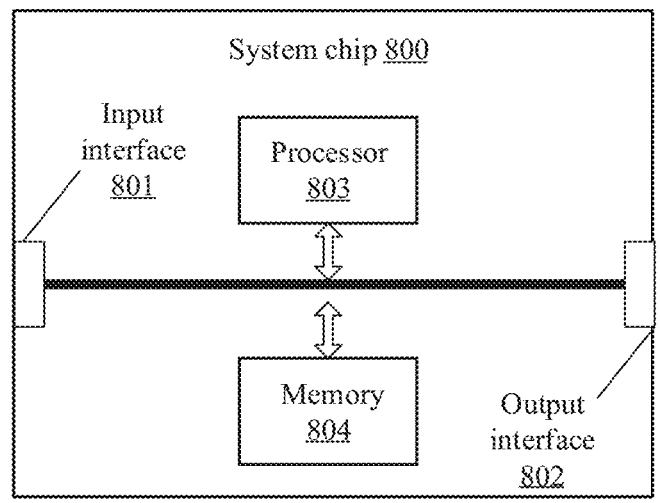
FIG. 5 is a schematic block diagram of a system chip according to an embodiment of the disclosure.

FIG. 5 is a schematic structure diagram of a system chip 800 according to an embodiment of the disclosure. The system chip 800 of FIG. 5 includes an input interface 801, output interface 802, processor 803 and memory 804 which may be connected through an internal communication connecting line. The processor 803 is configured to execute a code in the memory 804.

Optionally, when the code is executed, the processor 803 implements a method executed by a network device in the method embodiment. For simplicity, no more elaborations will be made herein.

Optionally, when the code is executed, the processor 803 implements a method executed by a terminal in the method embodiment. For simplicity, no more elaborations will be made herein.

Figure 6:
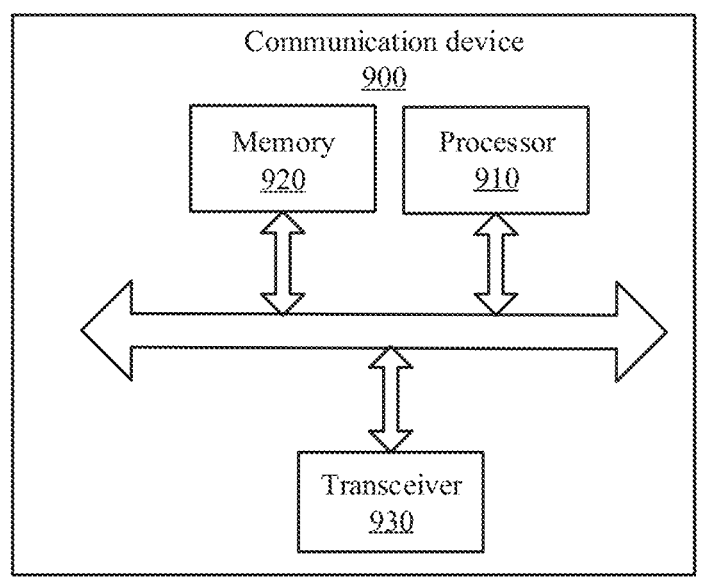
FIG. 6 is a schematic block diagram of a communication device according to an embodiment of the disclosure.

FIG. 6 is a schematic block diagram of a communication device 900 according to an embodiment of the disclosure. As illustrated in FIG. 6, the communication device 900 includes a processor 910 and a memory 920. Herein, the memory 920 may store a program code, and the processor 910 may execute the program code stored in the memory 920.

Optionally, as illustrated in FIG. 12, the communication device 900 may include a transceiver 930, and the processor 910 may control the transceiver 930 for external communication.

Optionally, the processor 910 may call the program code stored in the memory 920 to execute corresponding operations of the network device in the method embodiment. For similarity, elaborations will be omitted herein.

Optionally, the processor 910 may call the program code stored in the memory 920 to execute corresponding operations of the terminal in the method embodiment. For similarity, elaborations will be omitted herein.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for wireless communication, comprising:
   determining, by a terminal, K pieces of Scheduling Request (SR) information, K being a positive integer; and
   sending, by the terminal, M-bit first information on a target channel, the M-bit first information being used to indicate a scheduling request situation for at least part of the K pieces of SR information, M being a positive integer and a value of M being determined based on a range, within which the K falls, of ranges defined by at least one first numerical value.

2. The method of claim 1, wherein the target channel is configured to transmit second information for non-SR information; and
   the target channel overlaps, in a time domain, with a resource configured to transmit the K pieces of SR information.

3. The method of claim 1, wherein M is equal to K when K is less than or equal to the at least one first numerical value.

4. The method of claim 3, wherein the K pieces of SR information are in one to one correspondences with the M-bit first information by means of bit mapping.

5. The method of claim 1, wherein when K is greater than or equal to the at least one first numerical value, $$M=\mathrm{ceil}(\log_2(K+1)), \text{ or}$$

M is a second numerical value, the second numerical value being a constant less than K.

6. The method of claim 5, wherein the M-bit first information is used to indicate that each of the K pieces of SR information represents absence of SR,
   or indicate that at least one piece of the K pieces of SR information represents presence of SR.

7. A terminal, comprising:
   a processor configured to determine K pieces of Scheduling Request (SR) information, K being a positive integer; and
   a transceiver configured to send M-bit first information on a target channel, the M-bit first information being used to indicate a scheduling request situation for at least part of the K pieces of SR information, M being a positive integer and a value of M being determined based on a range, within which the K falls, of ranges defined by at least one first numerical value.

8. The terminal of claim 7, wherein the target channel is configured to transmit second information for non-SR information; and
   the target channel overlaps, in a time domain, with a resource configured to transmit the K pieces of SR information.

9. The terminal of claim 8, wherein the second information is Acknowledge (ACK)/Non-Acknowledge (NACK) information or Channel State Information (CSI).

10. The terminal of claim 7, wherein M is equal to K when K is less than or equal to the at least one first numerical value.

11. The terminal of claim 10, wherein the K pieces of SR information are in one to one correspondences with the M-bit first information by means of bit mapping.

12. The terminal of claim 7, wherein when K is greater than or equal to the at least one first numerical value, $$M=\mathrm{ceil}(\log_2(K+1)), \text{ or}$$

M is a second numerical value, the second numerical value being a constant less than K.

13. The terminal of claim 12, wherein the M-bit first information is used to indicate that each of the K pieces of SR information represents absence of SR,
   or indicate that at least one piece of the K pieces of SR information represents presence of SR.

14. The terminal of claim 7, wherein the processor is further configured to:
   determine a value of the M-bit first information according to at least one of: whether each of the K pieces of SR information represents presence of SR; or an ordering of the K pieces of SR information, and according to predefined mapping relationships,
   wherein in the predefined mapping relationships, different values of the M-bit first information correspond to different scheduling request situations for the K pieces of SR information.

15. The terminal of claim 14, wherein the ordering of the K pieces of SR information is associated with at least one of respective resource configuration parameters or service channel parameters for the K pieces of SR information; or the ordering of the K pieces of SR information is configured through high-layer signaling.

16. A network device, comprising:
   a transceiver configured to receive M-bit first information sent by a terminal on a target channel; and
   a processor configured to acquire a scheduling request situation for at least part of K pieces of Scheduling Request (SR) information of the terminal from the M-bit first information, M being a positive integer and a value of M being determined based on a range, within which the K falls, of ranges defined by at least one first numerical value.

17. The device of claim 16, wherein the target channel is configured to transmit second information for non-SR information; and
   the target channel overlaps, in a time domain, with a resource configured to transmit the K pieces of SR information.

18. The device of any one of claim 16, wherein M is equal to K when K is less than or equal to the at least one first numerical value.

19. The device of claim 18, wherein the K pieces of SR information are in one to one correspondences with the M-bit first information by means of bit mapping.

20. The device of claim 16, wherein when K is greater than or equal to the at least one first numerical value, $$M=\mathrm{ceil}(\log_2(K+1)), \text{ or}$$

M is a second numerical value, the second numerical value being a constant less than K.

\* \* \* \* \*